US010314437B2

(12) United States Patent
So

(10) Patent No.: US 10,314,437 B2
(45) Date of Patent: Jun. 11, 2019

(54) SINGLE-HANDLED CAN OPENER WITH AUTOMATIC CAN ENGAGEMENT

(75) Inventor: Shun So, Kowloon (HK)

(73) Assignee: UNION LUCKY INDUSTRIAL LIMITED, Kowloon (HK)

( * ) Notice: Subject to any disclaimer, the term of this patent is extended or adjusted under 35 U.S.C. 154(b) by 448 days.

(21) Appl. No.: 13/175,347

(22) Filed: Jul. 1, 2011

(65) Prior Publication Data

US 2011/0283551 A1    Nov. 24, 2011

(51) Int. Cl.
| A47J 43/25 | (2006.01) |
| A47J 36/34 | (2006.01) |
| B26D 3/18 | (2006.01) |
| F16B 47/00 | (2006.01) |
| B26D 5/10 | (2006.01) |
| B26D 7/06 | (2006.01) |

(52) U.S. Cl.
CPC ............... *A47J 43/25* (2013.01); *A47J 36/34* (2013.01); *B26D 3/185* (2013.01); *F16B 47/00* (2013.01); *B26D 5/10* (2013.01); *B26D 7/0608* (2013.01); *Y10T 83/8758* (2015.04)

(58) Field of Classification Search
CPC .. B67B 7/32; B67B 7/34; B67B 7/385; B67B 2007/303
USPC ........................................... 30/420–450, 210
See application file for complete search history.

(56) References Cited

U.S. PATENT DOCUMENTS

| 1,562,579 | A | * | 11/1925 | Nordhaus | 30/417 |
| 1,562,580 | A | * | 11/1925 | Nordhaus | 30/417 |
| 1,607,360 | A | * | 11/1926 | Nordhaus | 30/417 |
| 2,104,489 | A | * | 1/1938 | Killman | B67B 7/32 30/420 |
| 2,442,704 | A | * | 6/1948 | McLean | 30/420 |
| 2,474,982 | A | * | 7/1949 | McLean | 30/420 |
| 2,563,569 | A | * | 8/1951 | Walton | 30/422 |
| 2,568,962 | A | * | 9/1951 | Waldemar | 30/422 |
| 2,573,030 | A | * | 10/1951 | La Forte | 30/422 |

(Continued)

FOREIGN PATENT DOCUMENTS

| EP | 1 657 214 A1 | 5/2006 |
| EP | 1657214 A1 * | 5/2006 |

(Continued)

OTHER PUBLICATIONS

European Patent Office; Search Report in European Patent Application No. 14 16 4708 (dated Jun. 4, 2014).

*Primary Examiner* — Andrea L Wellington
*Assistant Examiner* — Fernando A Ayala
(74) *Attorney, Agent, or Firm* — Leydig, Voit & Mayer

(57) ABSTRACT

A can opener has a cutter blade mounted with a body and a traction wheel mounted with the body on or adjacent the cutter blade. One of the cutter blade or traction wheel is movable with respect to the other between an inoperative position and an operative position. In the inoperative position the traction wheel and the cutter blade are spaced apart so that a rim of a can to be opened may be located between the traction wheel and the cutter blade. In the operative position the traction wheel and the cutter blade engage a can for opening the can. The can opener has an operating element that is operable by a user of the can opener for turning the traction wheel. Operation of the operating element also moves the cutter blade and traction wheel from the inoperative position to the operative position.

12 Claims, 4 Drawing Sheets

(56) References Cited

U.S. PATENT DOCUMENTS

| | | | | |
|---|---|---|---|---|
| 2,573,031 A | * | 10/1951 | La Forte | 30/422 |
| 2,592,936 A | * | 4/1952 | McLean | 30/422 |
| 2,879,590 A | * | 3/1959 | McLean | 30/422 |
| RE27,504 E | * | 10/1972 | Smith | 30/418 |
| 3,949,468 A | * | 4/1976 | McLean et al. | 30/424 |
| 4,574,482 A | | 3/1986 | van der Wouden | |
| 5,121,546 A | * | 6/1992 | Chong | 30/418 |
| 5,367,776 A | * | 11/1994 | Chong | 30/417 |
| 5,400,509 A | * | 3/1995 | Collins | 30/161 |
| D405,332 S | | 2/1999 | So | |
| D406,026 S | | 2/1999 | So | |
| D406,027 S | | 2/1999 | So | |
| D409,888 S | | 5/1999 | So | |
| 6,058,613 A | | 5/2000 | So | |
| 6,647,631 B2 | | 11/2003 | So | |
| 6,675,487 B2 | | 1/2004 | So | |
| D496,569 S | | 9/2004 | Shun | |
| D500,647 S | | 1/2005 | So | |
| 6,851,195 B2 | | 2/2005 | So | |
| D503,598 S | | 4/2005 | So | |
| D513,950 S | | 1/2006 | So | |
| 7,004,049 B2 | | 2/2006 | So | |
| D521,827 S | | 5/2006 | So | |
| D562,658 S | | 2/2008 | So | |
| 7,596,874 B2 | * | 10/2009 | Mah et al. | 30/404 |
| 7,784,190 B2 | | 8/2010 | So | |
| 8,495,941 B2 | * | 7/2013 | Farid et al. | 83/620 |
| 8,555,763 B2 | * | 10/2013 | Farid et al. | 83/620 |
| 2001/0042312 A1 | * | 11/2001 | So | 30/426 |
| 2004/0064957 A1 | * | 4/2004 | So | 30/418 |
| 2005/0235501 A1 | | 10/2005 | So | |
| 2006/0101652 A1 | | 5/2006 | So | |

FOREIGN PATENT DOCUMENTS

| | | |
|---|---|---|
| GB | 1.197.175 A | 7/1970 |
| GB | 1 285 313 A | 8/1972 |

* cited by examiner

SINGLE-HANDLED CAN OPENER WITH AUTOMATIC CAN ENGAGEMENT

FIELD OF THE INVENTION

The invention relates to manually operable can openers, and in particular to can openers of the vertical-cutting and of a laterally-cutting type.

BACKGROUND TO THE INVENTION

Manually operable can openers have been known for many years and may be broadly categorised into three types: a first type having a cutter blade which cuts directly into the top wall of a can, known as a vertical-cutting type can opener, a second type having a cutter blade which cuts into the side wall of the can below the rim, and a third type which cuts partially into the rim of a can, with the second and third being known as laterally-cutting type can openers.

A typical can opener comprises first and second elongate operating elements pivotally connected to each other. Each operating element has a handle portion. One operating element has a rotatable traction wheel pivotally opposite its handle, and the other operating element has a cutter blade pivotally opposite its handle. Movement of the handles relative to each other moves the traction wheel and cutter blade between an inoperative position, to receive a rim of a can between the traction wheel and the cutter blade, and an operative position in which the traction wheel and cutter blade engage the rim of the can. During operation of the can opener the two handles must be firmly held together in one hand while an operating handle is turned (to move the can rim between the cutter and traction wheel) with the other hand.

Two problems with the above can opener are that the best position for holding the handles together is often not the most comfortable position for using the opener, and it can be difficult for persons with a weak grip to squeeze the handles together with sufficient force during operation of the can opener to properly engage the can rim between the cutter and traction wheel.

SUMMARY OF THE INVENTION

Generally, the invention provides a can opener comprising a body having an head and a handle extending from the head, a cutter blade mounted with the body on or adjacent the head and a traction wheel mounted with the body on or adjacent the cutter blade. One of the cutter blade or traction wheel is movable with respect to the other between an inoperative position, in which the traction wheel and the cutter blade are spaced apart so that a rim of a can to be opened may be located between the traction wheel and the cutter blade, and an operative position, in which the traction wheel and the cutter blade engage a can for opening the can. The can opener also comprises an operating element that is operable by a user of the can opener for turning the traction wheel. Operation of the operating element moves the cutter blade and traction wheel from the inoperative position to the operative position.

According to a first aspect of the invention there is provided a can opener comprising a body having a head and a handle extending from the head, and a cutter blade mounted with the body on or adjacent the head. A shaft is located with the head. A traction wheel is provided at a first end of the shaft. The shaft is rotatable about an axis and movable in a direction lateral to the axis between an inoperative position, in which the traction wheel and the cutter blade are spaced apart so that a rim of a can to be opened may be located between the traction wheel and the cutter blade, and an operative position, in which the traction wheel and the cutter blade engage a can for opening the can. An operating element is provided on one side of the can opener and supported by the body. Drive means couples the operating element and shaft for rotating the shaft by operation of the operating element. The shaft is biased toward the inoperative position and rotation of the shaft moves the shaft to the operative position.

Preferably, the can opener further includes a cam engagement surface and a cam located with the shaft, wherein rotation of the shaft engages the cam with the cam engagement surface, thereby moving the shaft to the operative position.

Preferably, the shaft is positioned in an arcuate slot in the head and moves in an arc.

Preferably, the shaft moves in an arc of between 25 and 30 degrees.

Preferably, the drive means comprises a first gear driven by the operating element and a second gear located on the shaft and engaged with the first gear for rotation of the shaft, an axis of rotation of the first gear being located at a center of the arc.

Preferably, the operating element is rotatable about an axis perpendicular to a rotational axis of the shaft, the drive means further including a first bevel-gear coupled to the operating element and a second bevel-gear engaging the first bevel-gear and coupled to the first gear.

Preferably, the first bevel-gear has fewer teeth than the second bevel-gear, providing a mechanical advantage for the operating element.

Preferably, the shaft is rotatable about an axis perpendicular to a longitudinal axis of the handle, and the operating element is rotatable about an axis perpendicular to the longitudinal axis of the handle and perpendicular to the axis of the shaft.

Preferably, the shaft is rotatable about an axis perpendicular to a longitudinal axis of the handle, and the operating element is rotatable about an axis oblique to the longitudinal axis of the handle and perpendicular to the axis of the shaft.

Preferably, the cutter blade is rotationally mounted with the body on a cutter axis oblique to the axis of the shaft.

According to a second aspect of the invention there is provided a can opener comprising a body having a head and a handle extending from the head. A cutter blade is mounted with the body on or adjacent the head. A fraction wheel is rotationally mounted with the head. An operating element is provided on one side of the can opener and is supported by the body for rotating the fraction wheel. The cutter blade is rotatable about an axis and movable in a direction lateral to the axis between an inoperative position, in which the traction wheel and the cutter blade are spaced apart so that a rim of a can to be opened may be located between the traction wheel and the cutter blade, and an operative position, in which the traction wheel and the cutter blade engage a can for opening the can. The cutter blade is biased in the inoperative position and rotation of the fraction wheel moves the cutter blade to the operative position.

Preferably, the can opener further includes a cam rotatable with the traction wheel and a cam-follower engageable with the cam for moving the cutter blade to the operative position.

Preferably, the cutter blade is mounted on a pivotal arm connected with the cam-follower.

Preferably, the arm and cutter blade move in an arc of between 25 and 30 degrees.

Preferably, the can opener further includes gearing for mechanically coupling the operating element to the fraction wheel, the gearing comprising a first bevel-gear coupled to the operating element and a second bevel-gear engaging the first bevel-gear and coupled to traction wheel.

Preferably, the first bevel-gear has fewer teeth than the second bevel-gear, providing a mechanical advantage for said operating element.

Preferably, the traction wheel is rotatable about an axis perpendicular to a longitudinal axis of the handle, and the operating element is rotatable about an axis oblique to the longitudinal axis of the handle and perpendicular to the axis of the traction wheel.

Preferably, the cutter blade is rotationally mounted on a cutter axis oblique to the axis of the traction wheel.

Further aspects of the invention will become apparent from the following description, which is given by way of example only.

BRIEF DESCRIPTION OF THE DRAWINGS

Embodiments of the invention will now be described with reference to the accompanying drawings in which.

DESCRIPTION OF THE PREFERRED EXAMPLES

Figure 1:
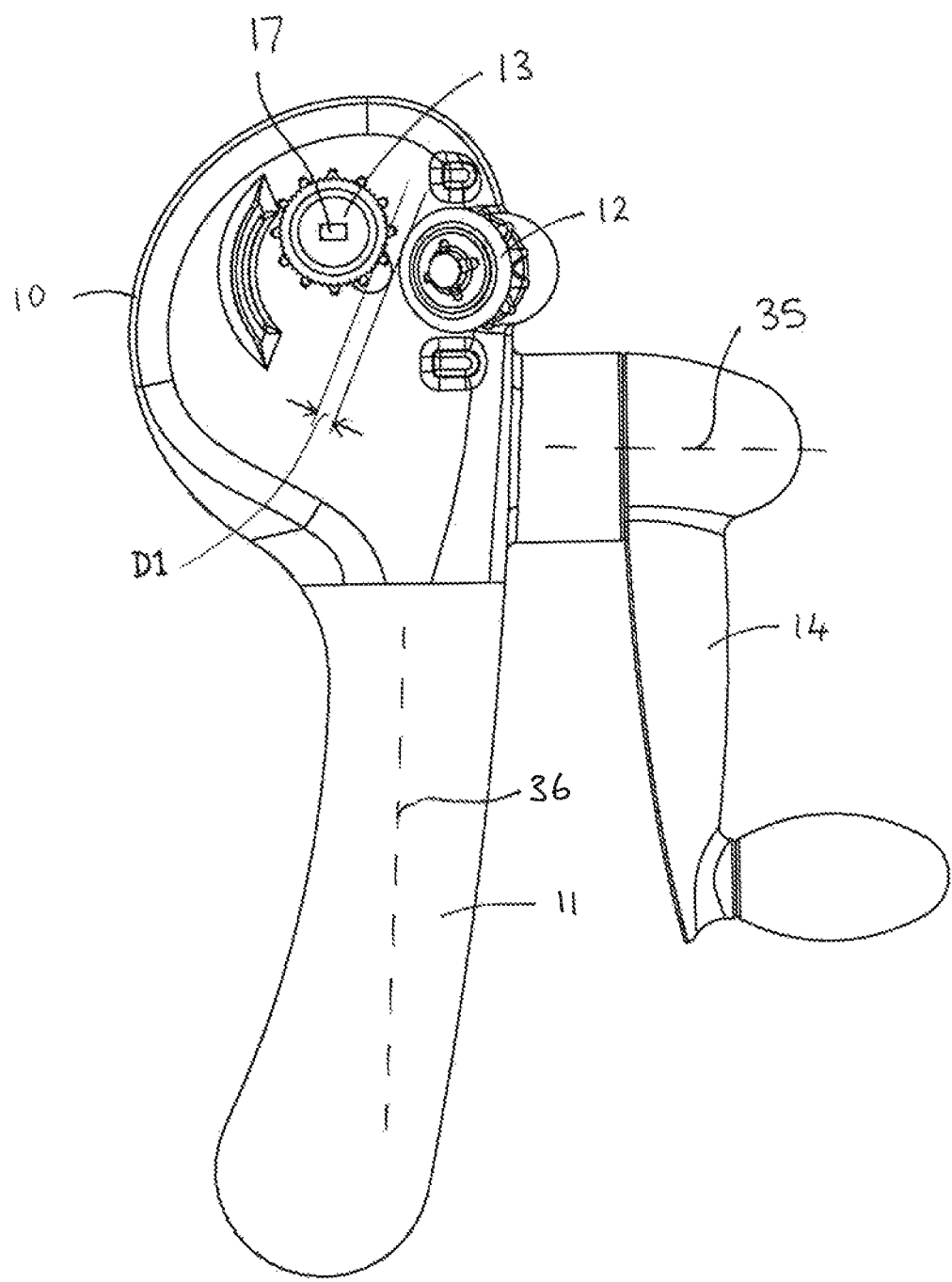
FIG. 1 illustrates a front side of a can opener according to a first aspect of the invention, shown in an inoperative condition.

The following description is given by way of example only to illustrate the invention and is not intended to limit the scope of use for functionality of the invention. In particular, the invention is not limited in its application to the details of construction and the arrangements of components set forth in the following description or illustrated in the accompanying drawings. The invention is capable of other embodiments and of being practiced or being carried out in various ways. Also, it is to be understood that the phraseology and terminology used is for the purpose of description and should not be regarded as limiting.

Referring to the drawings, the present invention relates to a can opener having a body with a head portion 10 and a single handle member 11 extending from the head 10. The single handle 11 of the current invention is in contrast to many can openers in the art in which the handle comprises a pair of elongate handle elements pivotally connected so as to form "scissor" type handle arrangement. Can openers of the current invention do not have a handle that comprises a pair of pivotally connected elongate handle elements. As is known in the art a cutter blade 12 and traction wheel 13 are rotatably mounted with the body on or adjacent the head 10. The cutter blade 12 is a circular cutter wheel type blade that is rotationally mounted on an oblique shaft 37 such that its axis of rotation is inclined at an angle of between 5° and 10° to the axis of rotation of the traction wheel 13. The traction wheel 13 is of generally cylindrical configuration providing an outer face having a plurality of circumferentially-spaced axially-extending teeth or serrations of substantially equal radii. The traction wheel 13 is coupled to a rotational operating element 14, 15 provided on one side of the can opener and supported by the head 10. The operating element 14, 15 is operable by a user of the can opener for turning the traction wheel 13 either directly, where the traction wheel 13 and operating element are on ends of the same stub-shaft, or indirectly via coupling gears 22, 23, 18, 19 located internally within the head 10. The operating element may be of various suitable types including, but not limited to, a butterfly-knob type element 14 or a crank-handle type element 15.

In various alternative embodiments of the invention, in addition to being rotatably mounted, one of the cutter blade 12 or traction wheel 13 is movable laterally with respect to the other, between an inoperative position and an operative position. In the inoperative position the traction wheel 13 and the cutter blade 12 are spaced apart from each other by a distance or clearance D1 which is sufficient to accommodate a rim of a can to be opened and located between the traction wheel 13 and the cutter blade 12. In the operative position, the distance or clearance between the traction wheel 13 and the cutter blade 12 is less that D1 such that both the traction wheel 13 and the cutter blade 12 engage the can for opening the can. The can opener may be either a rim cutting or end cutting type. In a rim cutting type the cutter blade 12 and traction wheel 13 are positioned, in use, on either side of the can rim to cut an outer metal layer of the can rim to release the (top) end of the can. In the end cutting type, the fraction wheel 13 engages the rim or can wall while the cutter pierces an end (notionally the top end) of the can to cut the end out of the can.

The cutter blade 12 or the traction wheel 13 is made laterally movable by rotationally mounting the blade or wheel on a shaft movable within a slotted journal or opening within the face of the head 10, or by rotatably mounting the blade or wheel to a lever or plate pivotally mounted to the face of the head, or by other suitable means. The cutter blade 12 or the fraction wheel 13 is biased toward the inoperative position such that, in an inactive state or prior to use, the cutter blade 12 or the traction wheel 13 is ready to receive the can between them, without fiddling or adjusting by the user. Operation of the operating element 14, 15 by the user is also arranged to cause the cutter blade 12 or the traction wheel 13 to move to the operative position as it rotates the fraction wheel 13. An eccentric cam 30 is rotationally coupled with the fraction wheel 13 such that, as the traction wheel 13 is rotated by operation of the operating element 14, 15, the cam 30 is caused to rotate. A cam surface or cam-follower is arranged in contact with the cam 30 and translates rotational movement of the traction wheel 13 and the cam 30 into lateral movement of the cutter blade 12 or the traction wheel 13. Movement of the cutter blade 12 or the traction wheel 13 from the inoperative position to the operative position is caused when the lobe 31 of the cam 30 is in contact with the cam surface or the cam-follower. The cutter blade 12 or the traction wheel 13 is prevented from returning to the inoperative position during the rotational phase, when the lobe 31 is out of contact with the cam surface or the cam-follower by way of the bite of the can between the cutter and the traction wheel 13, as the user continues to operate the operating element 14, 15 to cut the can rim or end. The biasing spring 20 is provided with sufficient strength to return the cutter blade 12 or the traction wheel 13 to the inoperative position when the can rim or end is cut through, or no can is engaged between the cutter blade 12 and the fraction wheel 13, but with insufficient spring strength to overcome the bite of the can between the cutter and the traction wheel 13 during the can opening operation.

Figure 2:
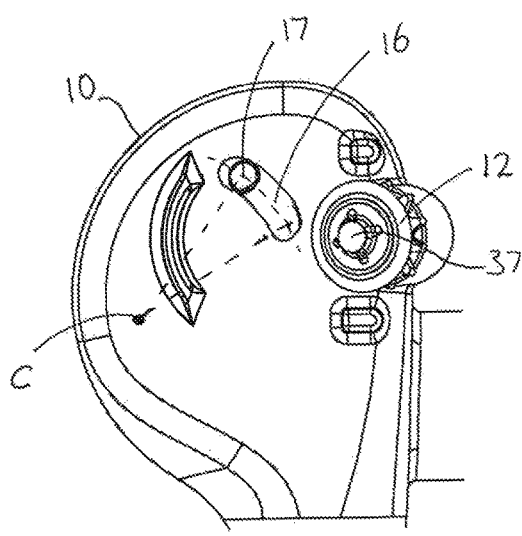
FIG. 2 shows the head of the can opener of FIG. 1 with the traction wheel removed to show features below the traction wheel.
Figure 3:
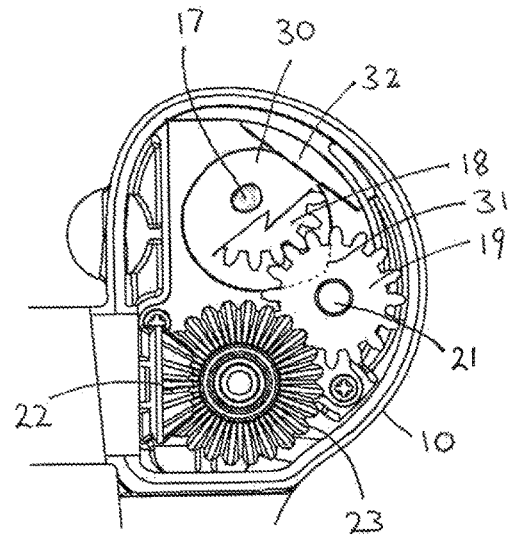
FIG. 3 shows the internal drive means of the can opener from the back side in the inoperative condition.
Figure 4:
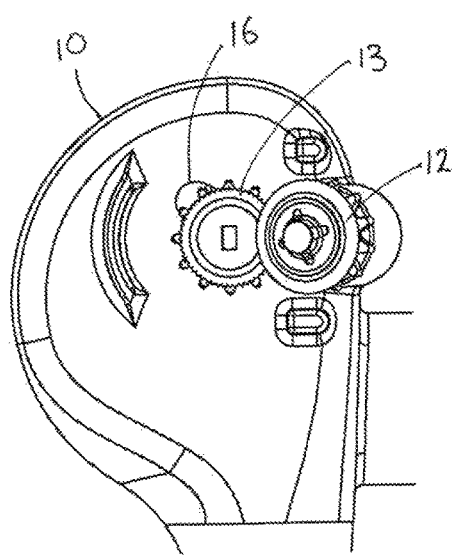
FIG. 4 shows the head portion with the can opener in the operative condition.
Figure 5:
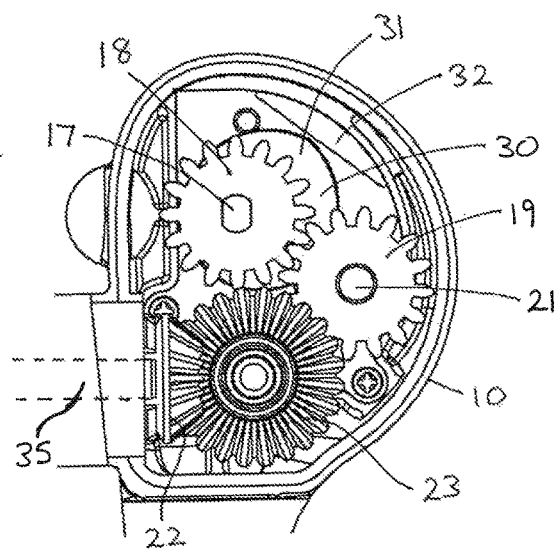
FIG. 5 shows the internal drive means of the can opener in the operative condition.
Figure 6:
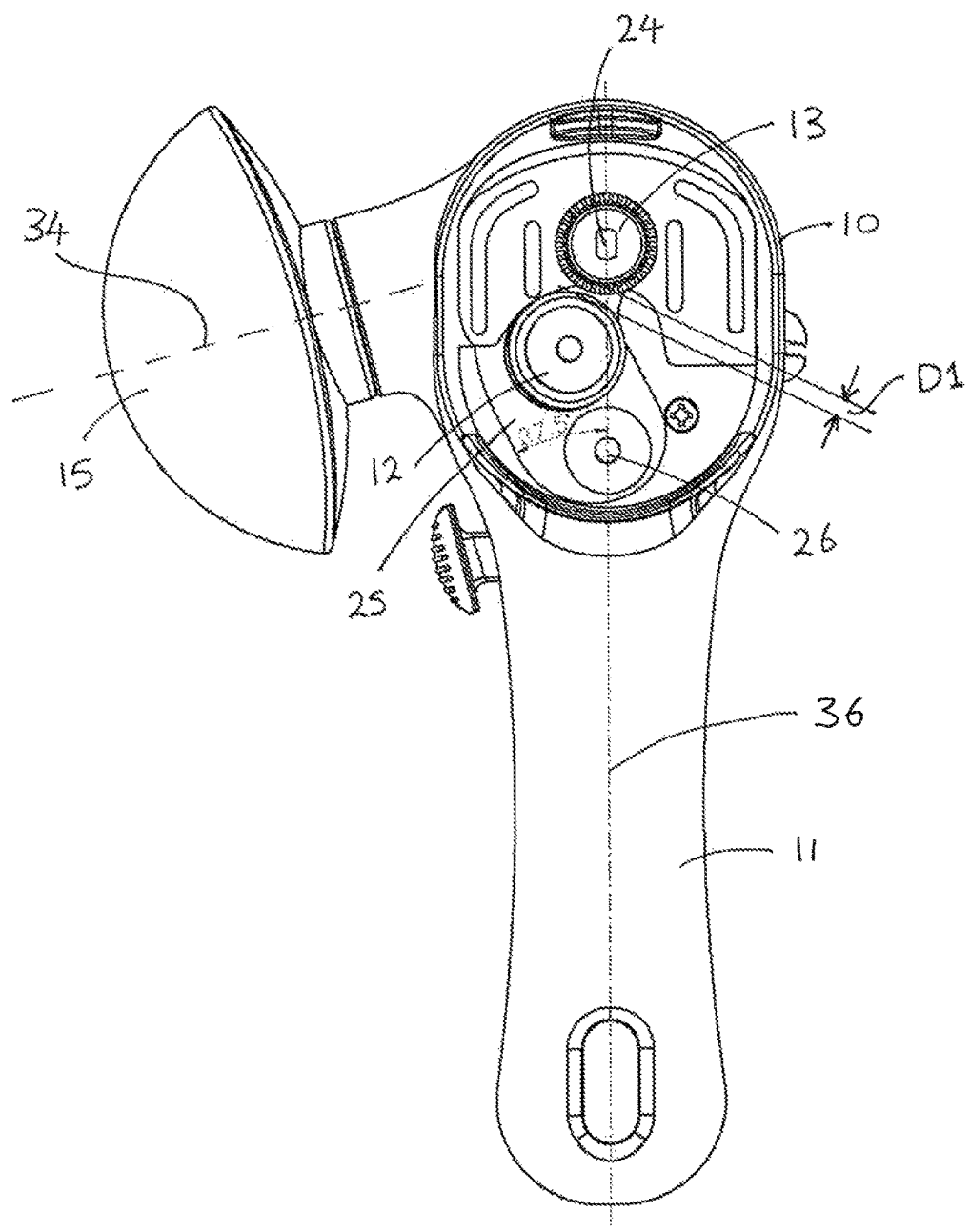
FIG. 6 shows the front side of a can opener according to a second embodiment of the invention in an inoperative condition.
Figure 7:
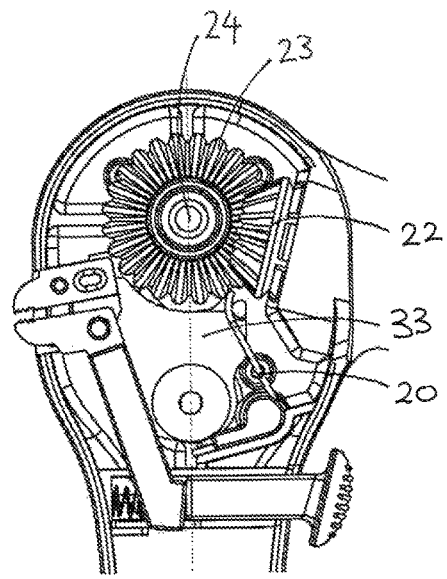
FIG. 7 shows the internal drive means of the can opener of FIG. 6.
Figure 8:
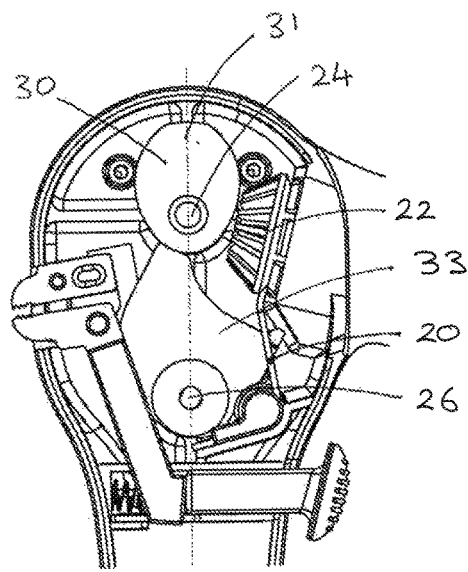
FIG. 8 shows the drive means of the can opener in the inoperative position, with a bevel-gear removed to show features below the bevel gear.
Figure 9:
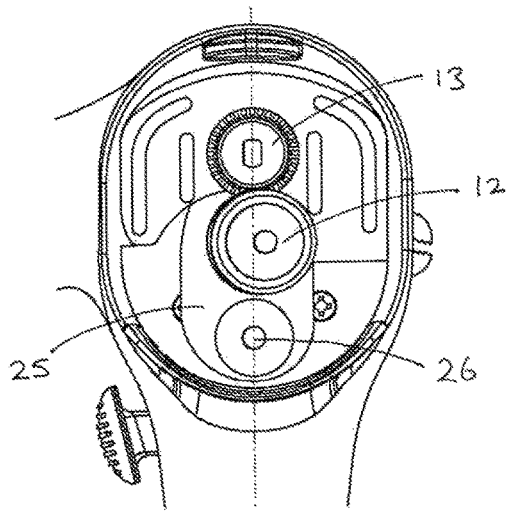
FIG. 9 shows the head portion of the can opener in the operative condition.
Figure 10:
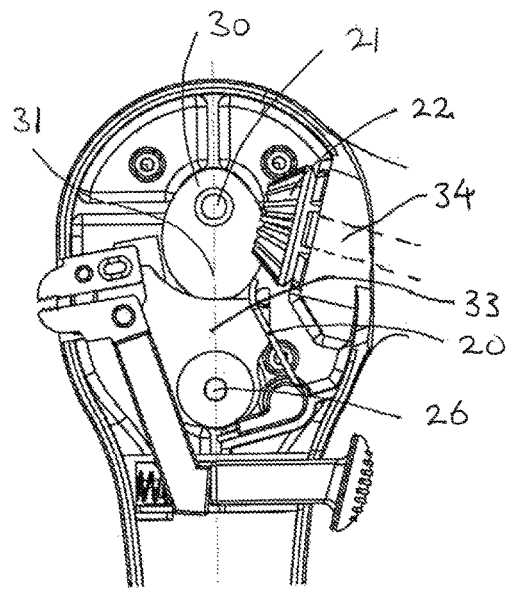
FIG. 10 shows the drive means of the can opener in the operative position.

FIGS. 1-5 illustrate a first preferred embodiment of the invention. In this embodiment the can opener comprises a body having a head 10 and a handle 11 extending from the head 10. The cutter blade 12 is mounted with the body on or adjacent the head 10. An arcuate slot 16 is located in the face of the head 10, adjacent the cutter wheel. A shaft 17 is rotationally located within the slot 16 and is movable in a lateral direction within the slot 16. A traction wheel 13 is fixedly attached to a first end of the shaft 17 on the face of the head 10 so as to be movable between an inoperative position and an operative position, with respect to the cutter blade 12. The second end of the shaft 17 located within the head 10. A cam 30 and a first traction wheel driving gear 18 are affixed to the second end of the shaft 17. Adjacent the cam 30 is an abutment 32 forming a cam surface against which the cam 30 bears. The shaft 17 is biased toward the inoperative position, as shown in FIG. 2, by a spring, such as a spiral torsion spring or torsion spring 20. As the traction wheel rotates, the cam lobe 31 contacts the cam surface 32, moving the shaft 17 and the traction wheel 13 laterally within the arcuate slot 16 towards the cutter blade 12 to the operative position.

An operating handle 14 is located on the side of the head 10 and is engaged with a first bevel-gear 22 located within the head 10. The first bevel-gear 22 engages with a second bevel-gear 23 which, in turn, engages with an intermediary flat gear 19. The traction wheel gear 18 is engaged with the intermediate gear 19 such that rotation of the operating handle 14 transmits rotational movement to the traction wheel shaft 17 via the chain of gears 22, 23, 19, and 18. The first bevel-gear 22 has fewer teeth than a second bevel-gear 23 to provide a mechanical advantage for the operating handle 14.

The intermediate gear 19 is located on a rotational axis 21 that is located to be concentric with the arc-center C of the arcuate slot 16. As the shaft 17 moves within the arcuate slot 16, the traction wheel 13 moves in an arc centered about the axis of rotation 21 of intermediate gear 19, and thus maintains a constant state of meshed engagement with intermediate gear 19 as shaft 17 moves laterally. In the preferred embodiment the shaft 17 moves through an arc of 25 and 30 degrees, although the arc maybe larger or smaller. A larger arc causes the cutter and blade to move further apart, making it more convenient to receive a can rim between the cutter and blade. An arc of 25 and 30 degrees reflects a compromise between convenience, cost, and design constraints.

In the second preferred embodiment the traction wheel shaft 17 is rotatable about an axis that is perpendicular to a longitudinal axis 36 of the handle 11, and the operating element 14 is rotatable about an axis 35 that is perpendicular to the longitudinal axis 36 of the handle 11 and perpendicular to the axis of the traction wheel shaft 17.

FIGS. 6-10 illustrate a second embodiment of the invention. In this embodiment the can opener comprises a body having a head 10 and a handle 11 extending from the head 10. A traction wheel 13 is mounted on the face of the head 10 and is rotated by an operating handle 15 located on the side of the head 10 via a pair of engaging bevel-gears 22, 23. The first bevel-gear 22 is directly coupled to a shaft of the operating element 15. The second bevel-gear 23 is directly coupled to a traction shaft 24 on which the traction wheel 13 is mounted. The first bevel-gear 22 has fewer teeth than a second bevel-gear 23, providing a mechanical advantage to the operating element 15. A cam 30 is also engaged with the traction shaft 24 and is rotates with the traction wheel 13.

A cutter blade 12 is rotationally mounted on a pivoting plate 25 located on the face of the head 10. The plate pivots about an axis of a pivot shaft 26 through an arc of between 25 and 30 degrees, preferably 27.5 degrees, to move the cutter blade 12 from the inoperative position with respect to the traction wheel 13, and the operative position with respect to the traction wheel 13. The pivot shaft 26 extends through to the inside of the head 10. A cam-follower plate 33 is fixed to the pivot shaft 26 and pivots internally to the head 10, with the pivoting plate 25 to which the cutter blade 12 is mounted. A torsion spring 20 engages the cam-follower plate 33 and biases the plate 33, and thus biases the pivoting plate 25 and the cutter blade 12, towards the inoperative position. The cam-follower plate 33 engages the cam 30. During rotation of the cam, the cam-lobe 31 moves the cam-follower 33, and thus pivot plate 25 and cutter blade 12, from the inoperative position to the operative position, engaging a can rim between the cutter blade 12 and the traction wheel 13.

In the second preferred embodiment the traction wheel 13 is rotatable about the traction wheel shaft 24 which has an axis perpendicular to a longitudinal axis of the handle, and the operating element is rotatable about an axis oblique to the longitudinal axis of the handle and perpendicular to the axis of the fraction wheel shaft.

Embodiments of the invention have been described, however it is understood that variations, improvements or modifications can take place without departure from the spirit of the invention or scope of the appended claims.

What is claimed is:
1. A can opener comprising:
a body having a head and a handle extending from the head;
a cutter blade mounted on the body, adjacent the head;
a traction wheel mounted on the head and rotationally mounted on a traction wheel shaft and rotatable with respect to the head;
an operating element located on one side of the can opener and supported by the body and, when rotated, rotating the traction wheel, wherein the cutter blade is rotatable about a cutter blade axis and is movable, relative to the head, in a lateral direction that is transverse to the cutter blade axis, between an inoperative position, in which the traction wheel and the cutter blade are spaced apart so that a rim of a can to be opened may be located between the traction wheel and the cutter blade, and an operative position for opening the can;
an eccentric cam fixedly mounted on the traction wheel shaft and rotating with rotation of the traction wheel, wherein the eccentric cam includes a lobe extending farther from the traction wheel shaft than other parts of the eccentric cam;
a cam-follower located internally in the head and engaging the eccentric cam and moving in response to rotation of the eccentric cam;

a pivoting plate shaft that extends from a face of the head into and through the head, and that is mounted on the head;

a pivoting plate located on the face of the head and fixedly mounted on the pivoting plate shaft, wherein
  the cam-follower is fixed to the pivoting plate shaft and thereby fixedly mounted with respect to the pivoting plate,
  the cam-follower pivots with pivoting of the pivoting plate,
  the cutter blade is rotationally mounted on the pivoting plate,
  the pivoting plate, upon pivoting, moves the cutter blade,
  rotation of the traction wheel, by rotation of the operating element, rotates the eccentric cam, and, via engagement of the eccentric cam and the cam-follower, converts rotation of the traction wheel into movement of the cutter blade along the lateral direction; and a torsion spring, wherein
  the torsion spring engages and biases the cam-follower and the pivoting plate, thereby rotationally biasing the cutter blade, about and with respect to the cutter blade axis, toward the inoperative position, and
  rotation of the traction wheel moves the cutter blade from the inoperative position to the operative position.

2. The can opener of claim 1, wherein the pivoting plate and the cutter blade move in an arc about the pivoting plate shaft through an angle in a range from 25 degrees to 30 degrees when the cutter blade moves between the operative and inoperative positions.

3. The can opener of claim 1 further including gearing mechanically coupling the operating element to the traction wheel, wherein the gearing comprises a first bevel-gear coupled to the operating element and a second bevel-gear engaging the first bevel-gear and coupled to the traction wheel.

4. The can opener of claim 3, wherein
the first bevel-gear and the second bevel gear have teeth, and
the first bevel-gear has fewer teeth than the second bevel-gear, providing a mechanical advantage for operating the operating element.

5. The can opener of claim 1, wherein
the traction wheel shaft, about which the traction wheel is rotatable, is perpendicular to a longitudinal axis of the handle, and
the operating element is rotatable about an axis that is oblique to the longitudinal axis of the handle and perpendicular to the traction wheel shaft.

6. The can opener of claim 1 including a cutter blade shaft on which the cutter blade is rotatably mounted, wherein the cutter blade shaft is oblique to the traction wheel shaft.

7. A can opener comprising:
a body having a head and a handle extending from the head;
a cutter blade mounted on the body, adjacent the head;
a traction wheel mounted on the head and rotationally mounted on a traction wheel shaft and rotatable with respect to the head;
an operating element located on one side of the can opener and supported by the body and, when rotated, rotating the traction wheel, wherein the cutter blade is rotatable about a cutter blade axis and is movable, relative to the head, in a lateral direction that is transverse to the cutter blade axis, between an inoperative position, in which the traction wheel and the cutter blade are spaced apart so that a rim of a can to be opened may be located between the traction wheel and the cutter blade, and an operative position for opening the can;

an eccentric cam fixedly mounted on the traction wheel shaft and rotating with rotation of the traction wheel, wherein the eccentric cam includes a lobe extending farther from the traction wheel shaft than other parts of the eccentric cam;

a cam-follower located internally in the head and engaging the eccentric cam and moving in response to rotation of the eccentric cam;

a pivoting plate shaft that extends from a face of the head into and through the head, and that is mounted on the head;

a pivoting plate located on the face of the head and fixedly mounted on the pivoting plate shaft, wherein
  the cam-follower is fixed to the pivoting plate shaft and thereby fixedly mounted with respect to the pivoting plate,
  the cam-follower pivots with pivoting of the pivoting plate,
  the cutter blade is rotationally mounted on the pivoting plate, and
  the pivoting plate, upon pivoting, moves the cutter blade; and a torsion spring, wherein
  the torsion spring engages and biases the cam-follower and the pivoting plate, thereby rotationally biasing the cutter blade, about and with respect to the cutter blade axis, toward the inoperative position, and
  rotation of the traction wheel moves the cutter blade from the inoperative position to the operative position.

8. The can opener of claim 7, wherein the pivoting plate and the cutter blade move in an arc about the pivoting plate shaft through an angle in a range from 25 degrees to 30 degrees when the cutter blade moves between the operative and inoperative positions.

9. The can opener of claim 7 further including gearing mechanically coupling the operating element to the traction wheel, wherein the gearing comprises a first bevel-gear coupled to the operating element and a second bevel-gear engaging the first bevel-gear and coupled to the traction wheel.

10. The can opener of claim 9, wherein
the first bevel-gear and the second bevel gear have teeth, and
the first bevel-gear has fewer teeth than the second bevel-gear, providing a mechanical advantage for operating the operating element.

11. The can opener of claim 7, wherein
the traction wheel shaft, about which the traction wheel is rotatable, is perpendicular to a longitudinal axis of the handle, and
the operating element is rotatable about an axis that is oblique to the longitudinal axis of the handle and perpendicular to the traction wheel shaft.

12. The can opener of claim 7 including a cutter blade shaft on which the cutter blade is rotatably mounted, wherein the cutter blade shaft is oblique to the traction wheel shaft.

* * * * *